US007702783B2

(12) United States Patent
McKinney

(10) Patent No.: US 7,702,783 B2
(45) Date of Patent: Apr. 20, 2010

(54) INTELLIGENT PERFORMANCE MONITORING OF A CLUSTERED ENVIRONMENT

(75) Inventor: Howard Milton McKinney, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/853,879

(22) Filed: Sep. 12, 2007

(65) Prior Publication Data

US 2009/0070457 A1 Mar. 12, 2009

(51) Int. Cl.
*G06F 15/16* (2006.01)
*G06F 12/00* (2006.01)
(52) U.S. Cl. ..................... 709/224; 718/105
(58) Field of Classification Search ......... 709/217–218, 709/223–229, 250; 718/105
See application file for complete search history.

(56) References Cited

U.S. PATENT DOCUMENTS

| 6,026,440 | A * | 2/2000 | Shrader et al. | 709/224 |
|---|---|---|---|---|
| 6,301,615 | B1 | 10/2001 | Kutcher | 709/224 |
| 6,553,404 | B2 | 4/2003 | Stern | 709/203 |
| 7,058,953 | B2 | 6/2006 | Willard et al. | 718/105 |
| 7,089,290 | B2 * | 8/2006 | Hennessey et al. | 709/213 |
| 7,139,939 | B2 | 11/2006 | Greenlee et al. | 714/55 |
| 2008/0001776 | A1 * | 1/2008 | Gross et al. | 340/870.01 |
| 2008/0034082 | A1 * | 2/2008 | McKinney | 709/224 |
| 2008/0306711 | A1 * | 12/2008 | Bansal | 702/182 |

OTHER PUBLICATIONS

Pacifici, Giovanni, Mike Spreitzer, Asser N. Tantawi, Alaa Youssef "Performance Management for Cluster-Based Web Services" *IEEE Journal on Selected Areas in Communications*, vol. 23, No. 12, Dec. 2005, pp. 2333-2343.
Saab, Celine Boutros, Xavier Bonnaire, Bertil Folliot "A Flexible Platform to Build Cluster Management Services" *IEEE International Conference on Cluster Computing*, Chemnitz, France, Nov. 28-Dec. 2000, pp. 258-265.

* cited by examiner

*Primary Examiner*—Zarni Maung
(74) *Attorney, Agent, or Firm*—Hamilton & Terrile, LLP; Stephen A. Terrile

(57) ABSTRACT

A method, system and computer-usable medium for selectively monitoring transactions in a cluster computing environment are disclosed. A transaction is received by a load balancer. A transaction monitoring manager determines if the received transaction is a candidate for monitoring. If it is, then the resource thresholds defined in the transaction's corresponding TMP are determined. The load balancer is then interrogated to determine which application server instance is assigned to process the transaction. Once determined, resource usage information is collected from the target application server instance and provided to the transaction monitoring manager. The collected resource information is compared to the transaction's corresponding TMP. If resource usage exceeds resource threshold values contained in the TPM, then the transaction is monitored. Otherwise it is not.

20 Claims, 5 Drawing Sheets

INTELLIGENT PERFORMANCE MONITORING OF A CLUSTERED ENVIRONMENT

BACKGROUND OF THE INVENTION

1. Field of the Invention

Embodiments of the disclosure relate in general to the field of computers and similar technologies, and in particular to software utilized in this field. Still more particularly, it relates to selectively monitoring transactions in a cluster computing environment.

2. Description of the Related Art

Monitoring the performance and availability of software applications, including those that may be spread across multiple physical systems and involve multiple physical resources, is a key task in system administration. This monitoring is typically performed by instrumenting software to include additional instructions, generally referred to as probes, to report performance information such as application response time. Performance monitoring may also be implemented by adding a software component, sometimes referred to as a plug-in, to the application. The plug-in is then invoked in-line with the application during the execution of a transaction. Regardless of how it is implemented, performance monitoring needs to take place in real-time to be useful. As a result, any such monitoring causes some degree of run-time performance overhead on the systems being monitored. Accordingly, there is a need for control mechanisms that provide an adequate degree of granularity when configuring performance monitoring activities.

Existing approaches include selectively turning performance monitoring on or off based on individual applications or logic components. For example, when a user initiates a transaction from a Web browser, the hypertext transfer protocol (HTTP) request is sent to a Web server, which in turn may make a call to an application server and a database server. Traditionally, the entire application running respectively on the Web server, the application server, and the database server would be monitored in order to determine the root causality of a performance problem. However, there are two major drawbacks to this methodology. First, when transaction monitoring is enabled for an application, all business transactions in the application are monitored, regardless of whether they are relevant to identification of the performance problem. This incurs more overhead in terms of CPU usage, memory, etc. than necessary to solve the problem. Second, when transaction monitoring is enabled for an application, every transaction in the application will generate additional monitoring information at the same level. The volume of accumulated data can become very high within a short period of time, thus incurring additional processing overhead. The high volume of data can also obscure the root cause of the problem due to the sheer quantity of irrelevant data the user has to review.

Another approach, currently used in the IBM Tivoli Monitor for Transaction Performance, associates each transaction with a token that embeds the entire monitoring configuration that should be used for the transaction. Each instrumented application has an entry point (e.g., a uniform resource locator, or URL) for monitoring each transaction (e.g., an HTTP request from a browser). Once these entry points are defined for the application, monitoring policies are associated with those entry points. The monitoring policy is represented as a token, which embeds all information necessary to monitor the transaction. However, no other control mechanism is provided for deciding when the transaction should be monitored, other than a predefined sampling rate. This can be problematic as anomalies in the system could occur during transactions that are not being monitored. In a yet another approach, an application monitoring policy is implemented that includes a description of the server resources that are to be monitored, along with limits that each resource should not exceed. Example of server resources that might be monitored include the amount of free virtual memory on a given server, processor utilization, current thread pool size, etc. If the application monitoring policy indicates that the transaction should be monitored, then any resource thresholds defined in the policy are checked. If no resource thresholds have been exceeded at the instant that the transaction arrived at the server, then the transaction is not monitored. If a predetermined resource threshold has been exceeded, then the transaction could potentially experience a performance degradation and should be monitored. Once a decision is made to monitor the transaction, the instrumentation probes monitor the transaction from that point forward.

However, none of these solutions provide adequate granularity when the monitored systems are part of a clustered environment. A cluster of application servers typically has a load balancer in front of two or more application servers. The load balancer determines which back-end server should receive a current inbound transaction. Approaches that monitor a transaction only when a specific system resource is above or below some predefined threshold, as described above, do not work very well in clustered environments. In order to monitor only those back-end servers that are experiencing system resource issues, the transaction performance monitor needs to know in advance which of the back-end servers the current transaction is to be routed. For example, if an application server cluster has three back-end application servers and a load balancer on the front end, an incoming transaction could be routed to any of the three back-end application servers. If the goal is to monitor the transaction only when a resource threshold has been exceeded on one of these three back-end systems, the application monitoring policy needs to know which of the back-end servers the transaction will be routed to know whether or not it should be monitored. Otherwise, the transaction would have to be monitored on each back-end server regardless of the server's current resource usage.

BRIEF SUMMARY OF THE INVENTION

The present invention includes, but is not limited to, a method, system and computer-usable medium for selectively monitoring transactions in a cluster computing environment. In various embodiments, a transaction is received by a load balancer. A transaction monitoring manager compares the received transaction's identification information to a predetermined transaction monitoring policy (TMP) to determine if the received transaction is a candidate for monitoring. If it is, then the transaction monitoring manager determines the resource thresholds defined in the transaction's corresponding TMP. The load balancer is then interrogated by the transaction monitoring manager to determine which application server instance within the cluster computing environment is assigned to process the transaction. Once determined, resource usage information is collected from the target application server instance and provided to the transaction monitoring manager.

In one embodiment, a first resource monitor connected to the load balancer and a second resource monitor connected to a deployment manager respectively provide transaction assignment and resource information to the transaction monitoring manager. In this embodiment, the deployment manager receives the collected resource information from a node agent implemented on each application server instance. In another embodiment, the resource information is provided by a management agent implemented on each computer system in the cluster environment. The management agent, in turn, receives the collected resource information from a node agent implemented on each application server instance.

The transaction monitoring manager then compares the collected resource information to the transaction's corresponding TMP. If resource usage on the target application server instance exceeds resource threshold values contained in the TPM, then the transaction is monitored. Otherwise it is not, thereby reducing the number of transactions that are unnecessarily monitored. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
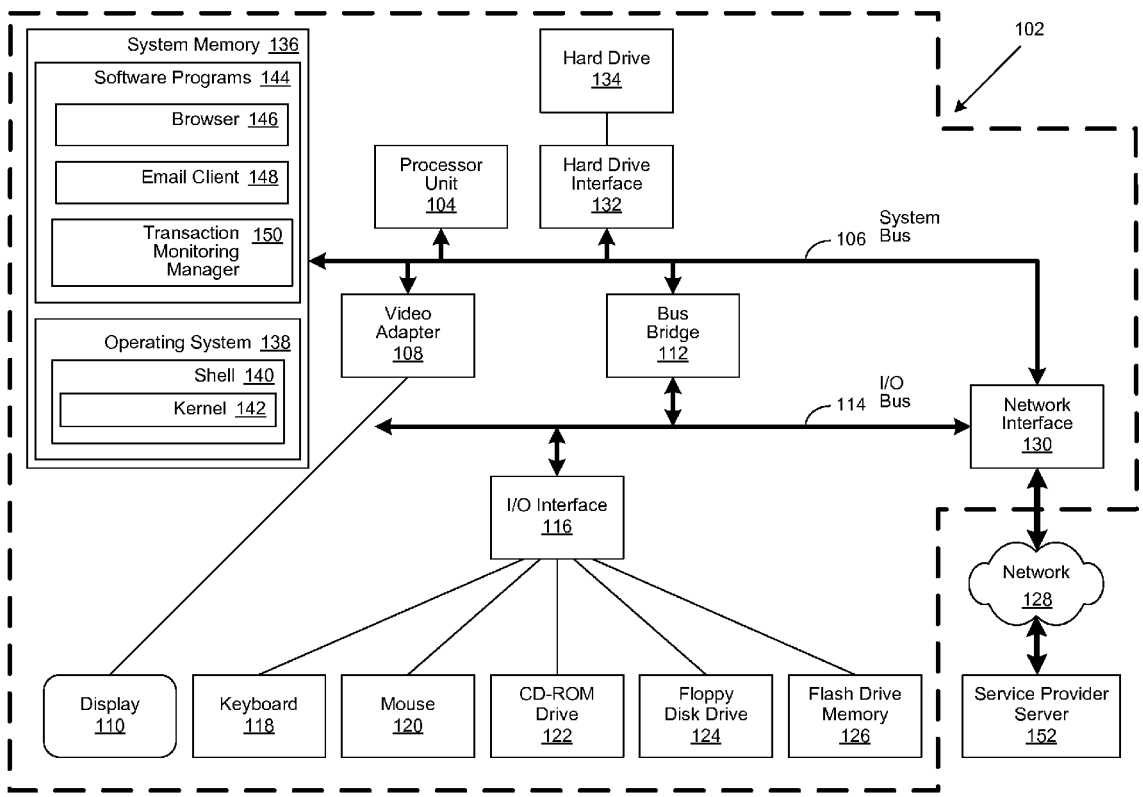
FIG. 1 depicts an exemplary client computer in which the present invention may be implemented.

A method, system and computer-usable medium are disclosed for selectively monitoring transactions in a cluster computing environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a transaction monitoring manager 150. Transaction monitoring manager 150 includes code for implementing the processes described in FIGS. 2 through 5 described hereinbelow. In one embodiment, client computer 102 is able to download transaction monitoring manager 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
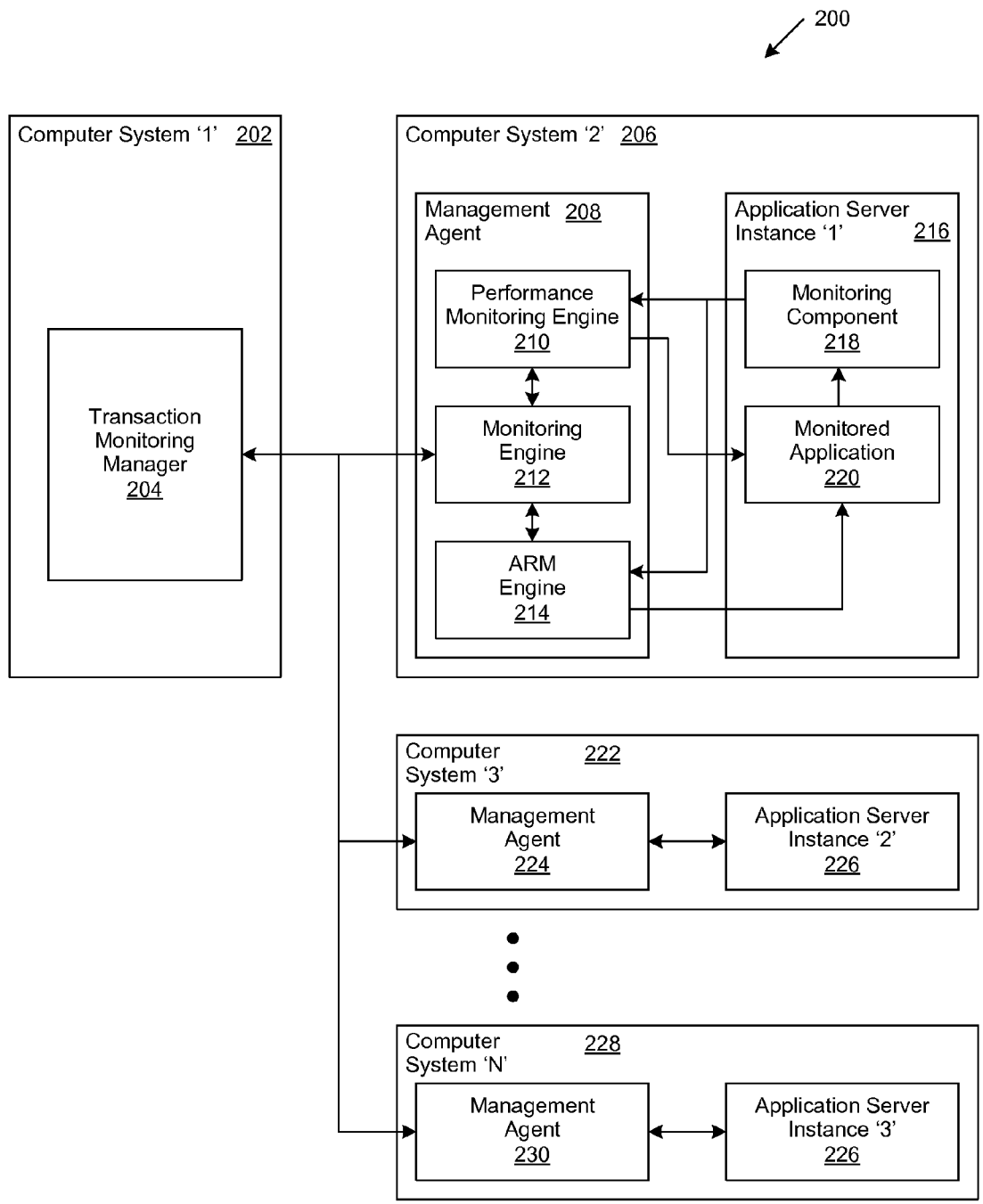
FIG. 2 shows a transaction monitoring manager 204 as implemented in an embodiment of the invention to monitor transactions.

FIG. 2 shows a transaction monitoring manager 204 as implemented in an embodiment of the invention. In this embodiment, a transaction monitoring environment 200 comprises computer system '1' 202, monitored computer system '2' 206, and monitored computer systems '3' 222 through 'N' 228. Computer system '1' 202 further comprises transaction monitoring manager 204, which monitors the performance of individual transactions as they are processed on computer system '2' 206, and computer systems '3' 222 through 'N' 228. Computer system '2' 206 further comprises management agent 208, which collects transaction performance and resource information from application server instance '1' 216. Likewise, computer system '3' 206 and 'N' 228 respectively comprise management agent 224 and 230, which in turn respectively collect transaction performance and resource information from application server instance '2' 216 and '3' 226. In various embodiments, application server instances '1' 216, and '2' 216 through '226' may be implemented using an application server application such as the WebSphere Application Server available from International Business Machines Corporation. The transaction monitoring manager 204 monitors the performance of a transaction being processed on computer system '2' 206, '3' 222, or 'N' 228 by receiving transaction performance and resource information respectively collected by management agent 208, 224 or 230.

In this and other embodiments, a system administrator typically configures the transaction monitoring manager 204 to define a transaction monitoring policy (TMP) for transactions occurring within performance monitoring environment 200. The system administrator also defines acceptable threshold levels for predetermined resources such as allocated system memory. In one embodiment, monitoring engine 212, performance monitoring engine 210 and Application Response Measurement (ARM) engine 214 are implemented as part of management agent 208. In this embodiment, monitoring engine 212 is an agent process responsible for matching the collected transaction information with the list of user defined monitoring policies and ARM engine 214 is an implementation-specific component used for collecting response time metrics. Management agent 208 is a mechanism distributed among different monitored computer systems within the performance monitoring environment 200, including monitored computer systems '2' 206 and '3' 222 through '4' 228 for matching transactions to their associated TMPs. In addition, when the TPM resource threshold information is updated in the transaction monitoring manager 204, it is sent to each management agent 208, 224, 230 in performance monitoring environment 200.

When the monitoring engine in a management agent, such as monitoring engine 212 in computer system '2' 206, receives the updated TPM resource threshold information, monitoring engine 212 in turn notifies either performance monitoring engine 210 if the thresholds are based on resource measurements, or ARM engine 214 if the thresholds are based on transaction monitoring. As an example, the monitored application 220 runs a monitored transaction at run time. A monitoring component 218, such as an agent node, generates the transaction by intercepting the call and invoking a "start" method on performance monitoring engine 210 or an "ARM- _start" method on ARM engine 214. Performance monitoring engine 210 or ARM engine 214 then matches the transaction via monitoring engine 212 against defined policies in monitoring engine 212 to see if the transaction is defined in a TMP. If the transaction is defined in a TMP, meaning that the monitored application 220 is being monitored, then monitoring engine 212 notifies ARM engine 214 or performance monitoring engine 210 to measure the performance of the transaction. If management agent 208 detects that a threshold violation has occurred, ARM engine 214 or performance monitoring engine 210 automatically sends a violation event to the transaction monitoring manager 204. Upon receiving the violation event, the transaction monitoring manager 204 identifies the corrective action associated with the violation event and sends the corrective action response to management agent 208. The transaction monitoring manager 204 also sends the corrective action response a defined set of management agents capable of affecting the transaction, such as management agents 208, 222, and 230. Each management agent then runs the corrective action to remedy the performance problem.

Figure 3:
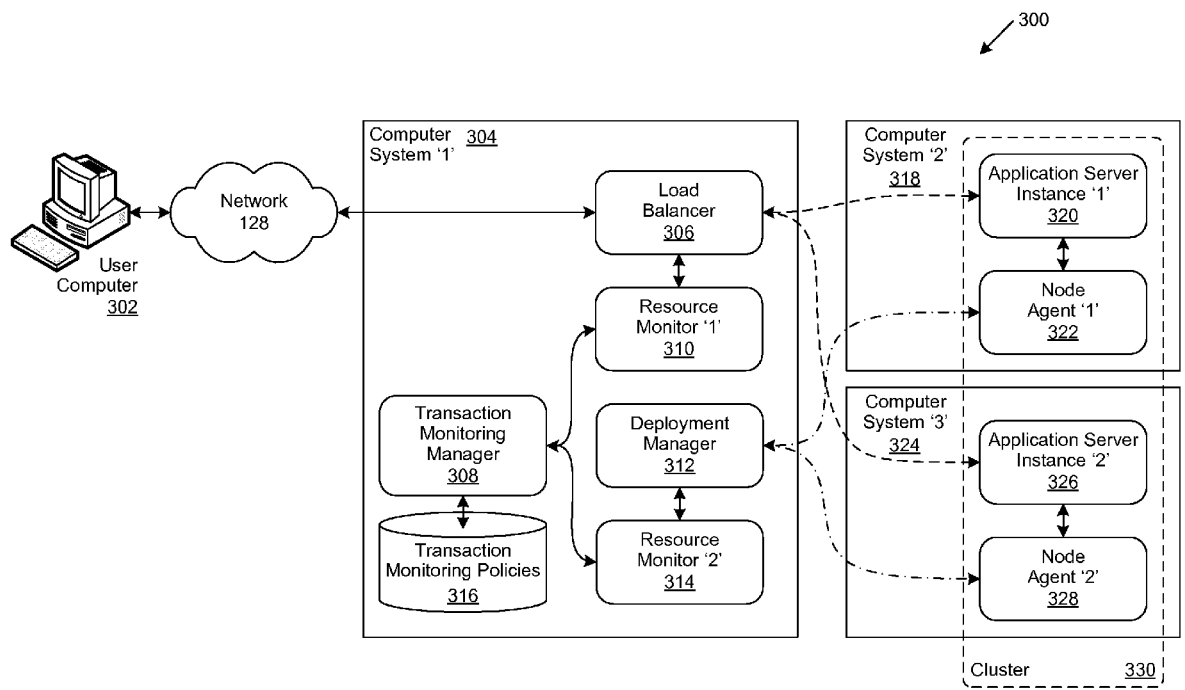
FIG. 3 shows a simplified block diagram of a transaction monitoring manager as implemented with a deployment manager to selectively monitor transactions.

FIG. 3 shows a simplified block diagram of a transaction monitoring manager as implemented with a deployment manager to selectively monitor transactions. In this embodiment, computer system '1' 304, computer system '2' 318, and computer system '2' 324 comprise a cluster computing environment 300. A transaction is initiated on user computer 302 and communicated over network 128 to computer system '1' 304, where it is received by load balancer 306. Once received, the transaction monitoring manager 308 compares the incoming transaction's address to a predetermined transaction monitoring policy (TMP) 316 to determine whether the transaction is a candidate to be monitored during processing. TMPs 316 generally comprise a plurality of predetermined resource thresholds and other transaction processing and monitoring information. In implementation, the TMP 316 typically defines which transactions are initially determined to be candidates for monitoring during processing on a predetermined application server instance. Based on the individual TMP 316, a transaction performance monitor may dynamically include or exclude components in an implemented transaction model based on the transaction instance as well as predetermined performance thresholds. For example, a threshold may be defined as an acceptable response time, which is the maximum amount of time it may take for a given transaction to complete.

If the transaction monitoring manager 308 determines that the transaction is a candidate for monitoring, then the resource thresholds of its corresponding TMP 316 are determined. The load balancer 306 is then interrogated by the transaction monitoring manager 308 to determine whether application server instance '1' 320 or application server instance '2' 326 in computer cluster 330 is assigned to process the incoming transaction. In this embodiment, a first resource monitor 310 connected to the load balancer 306 provides the transaction assignment information to the transaction monitoring manager 308. Once the target application server instance has been determined, its corresponding resource information is collected and provided to the transaction monitoring manager 308. The collected resource information can include the availability of resources for the application server instance as well as its current usage thereof. In this embodiment, a second resource monitor 314 provides the resource information to the transaction monitoring manager 308. The second resource monitor 314 collects the resource information from the deployment manager 312, which is responsible for the allocation of computer system 318, 324 resources to each application server instance 320, 326. The deployment manager 312, in turn, receives the collected resource information from node agents '1' 322 and '2' 328, which are respectively connected to application server instance '1' 320 and '2' 326.

Then the transaction monitoring manager 308 compares the collected resource information to the transaction's corresponding TMP 316. A determination is made whether resource usage on the target application server instance (e.g., 320, 326) exceeds resource threshold values contained in the TPM 316. If it is determined that the resource usage on the target application server instance (e.g., 320, 326) exceeds resource threshold values contained in the TPM 316, then the transaction is monitored. In one embodiment, a probe, or other similar instrumentation in the application running on the application server instance, monitors entry points, or locations in the application where transactions occur.

Figure 4:
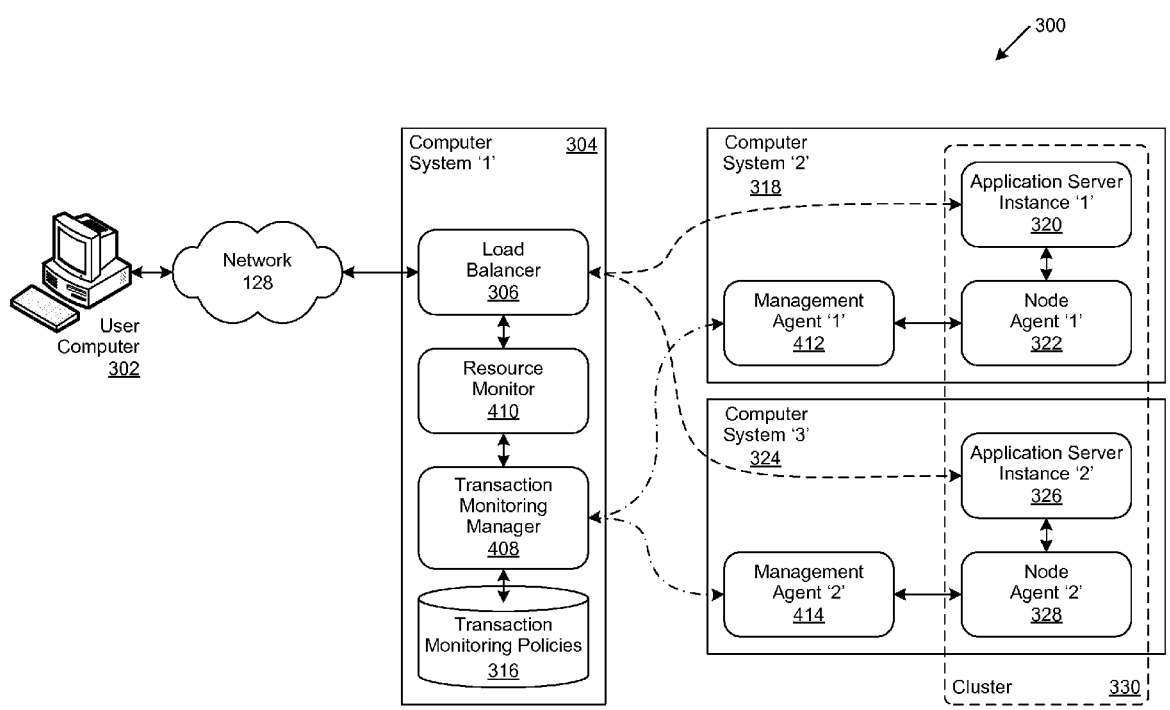
FIG. 4 shows a simplified block diagram of a transaction monitoring manager as implemented with management agents to selectively monitor transactions.

FIG. 4 shows a simplified block diagram of a transaction monitoring manager as implemented with management agents to selectively monitor transactions. In this embodiment, computer system '1' 304, computer system '2' 318, and computer system '2' 324 comprise a cluster computing environment 300. A transaction is initiated on user computer 302 and communicated over network 128 to computer system '1' 304, where it is received by load balancer 306. Once received, the transaction monitoring manager 308 compares the incoming transaction's address to a predetermined transaction monitoring policy (TMP) 316 to determine whether the transaction is a candidate to be monitored during processing. TMPs 316 generally comprise a plurality of predetermined resource thresholds and other transaction processing and monitoring information. In implementation, the TMP 316 typically defines which transactions are initially determined to be candidates for monitoring during processing on a predetermined application server instance.

If the transaction monitoring manager 308 determines that the transaction is a candidate for monitoring, then the resource thresholds of its corresponding TMP 316 are determined. The load balancer 306 is then interrogated by the transaction monitoring manager 308 to determine whether application server instance '1' 320 or application server instance '2' 326 in computer cluster 330 is assigned to process the incoming transaction. In this embodiment, a resource monitor 410 connected to the load balancer 306 provides the transaction assignment information to the transaction monitoring manager 308. Once the target application server instance (e.g., 320, 326) has been determined, its corresponding resource information is collected and provided to the transaction monitoring manager 308. The collected resource information can include the availability of resources for the application server instance as well as its current usage thereof. In this embodiment, the resource information is provided by management agents '1' 412 and '2' 414, respectively implemented on computer systems '1' 318 and '2' 324 in the cluster environment 300. The management agents '1' 318 and '2' 324, in turn, respectively receive the collected resource information from node agents '1' 322 and '2' 328 which are respectively connected to application server instance '1' 320 and '2' 326.

Then the transaction monitoring manager 308 compares the collected resource information to the transaction's corresponding TMP 316. A determination is made whether resource usage on the target application server instance (e.g., 320, 326) exceeds resource threshold values contained in the TPM 316. If it is determined that the resource usage on the target application server instance (e.g., 320, 326) exceeds resource threshold values contained in the TPM 316, then the transaction is monitored. In one embodiment, a probe, or other similar instrumentation in the application running on the application server instance, monitors entry points, or locations in the application where transactions occur.

Figure 5:
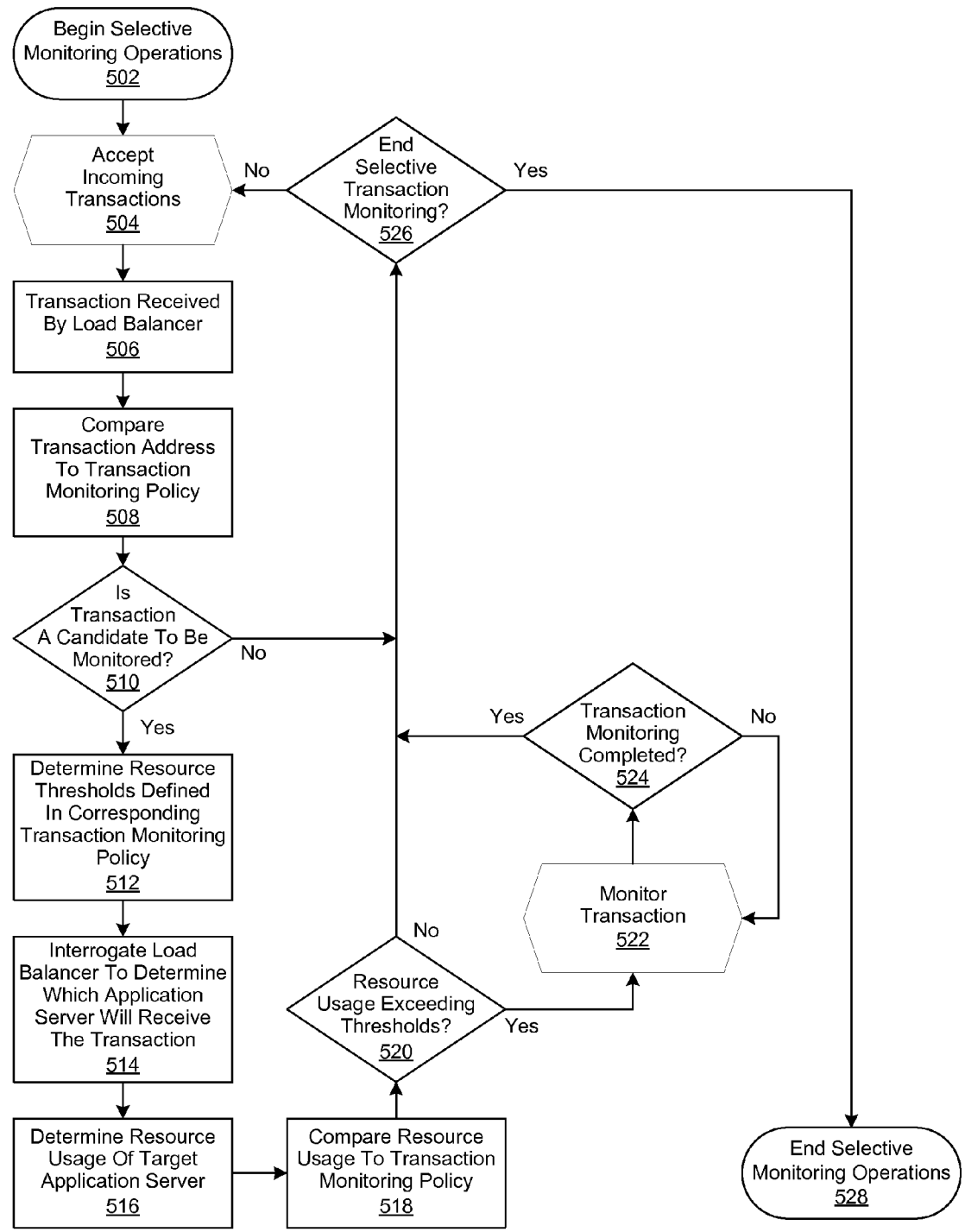
FIG. 5 shows a flowchart of a transaction monitoring manager as implemented to selectively monitor transactions.

FIG. 5 shows a flowchart of a transaction monitoring manager as implemented to selectively monitor transactions. In this embodiment, selective transaction monitoring operations begin in step 502, followed by the ongoing acceptance of incoming transactions for monitoring in step 504. For example, incoming transactions can be computer operations that are initiated by a user, such as initiating a purchase transaction for an item at a Web site. The initiation of such a transaction typically results in the initial transaction request being sent from a Web browser to a Web server, and from there to an application server. The transaction may further invoke other operations, such as accessing a database that may reside on a different server. Transactions can also include the chain of sub-transactions initiated by the original request.

In step 506 an incoming transaction is received by a load balancer implemented in a cluster computer environment. Once received, the transaction monitoring manager compares the incoming transaction's address to a predetermined transaction monitoring policy (TMP) in step 508 to determine whether the transaction is a candidate to be monitored during processing. Those of skill in the art will be familiar with TMPs, which generally comprise a plurality of predetermined resource thresholds and other transaction processing and monitoring information. In implementation, the TMP typically defines which transactions are initially determined to be candidates for monitoring during processing on a predetermined application server instance. Based on the individual TMP, a transaction performance monitor may dynamically include or exclude components in an implemented transaction model based on the transaction instance as well as predetermined performance thresholds. For example, a threshold may be defined as an acceptable response time, which is the maximum amount of time it may take for a given transaction to complete.

As a further example, an individual transaction or a group of transactions can be monitored according to a first TMP, meaning certain resource information specified by the policy is gathered about the transaction as it is being processed. Other transactions in the same application may be monitored according to a second TMP, meaning other information is gathered as specified in the second TMP. Some transactions need not be monitored at all. According to the invention, any number of TMPs can be put in place, and various transactions can be monitored in different ways by associating respective transactions with respective differing sets of policies. Because the present invention allows for specific information about a transaction to be selectively collected, it can minimize the computational overhead associated with monitoring transactions and reduce the amount of data generated by transaction monitoring.

A determination is then made in step 510 whether the transaction is a candidate to be monitored. In various embodiments of the invention, each instrumented, or monitored, application running on an application server instance has entry points for transactions that should be monitored. An entry point, or edge transaction, is the first location in the monitored application where a transaction is recorded by the monitoring application. For example, an application server instance may satisfy Web page requests, and the request could be defined as a uniform resource locator (URL), such as http://www.ibm.com/buycomputers. A Web server plug-in that is listening for incoming hypertext transfer protocol (HTTP) requests may identify this URL and detect if it matches a given TMP. Alternatively, a probe that has been inserted into an instrumented application server instance could intercept all servlet requests and identify the incoming HTTP request and URL in a similar fashion. If the identified URL matches a given TMP, it is recorded as a transaction and used to represent the entry point into the monitored application. Other possible entry points include transactions over Web services, remote method invocation (RMI), Java Database Connectivity (JDBC), Java Connection Architecture (JCA), Java Message Service (JMS), Microsoft .NET, shell scripts, etc. However, if an incoming transaction is submitted to determine whether it should be monitored and the identification information about the transaction does not match a corresponding monitoring policy, then the transaction should not be monitored. If it is determined in step 510 that the transaction is not a candidate for monitoring, then a determination is made in step 526 whether selective transaction monitoring should be discontinued. If it is determined that selective transaction monitoring should be continued, the process continues, beginning in step 504, with the ongoing acceptance of incoming transactions. Otherwise, selective transaction monitoring operations are ended in step 528.

However, if it is determined in step 510 that the transaction is a candidate for monitoring, then the resource thresholds of its corresponding TMP are determined in step 512. The load balancer is then interrogated by the transaction monitoring manager in step 514 to determine which application server instance in the cluster environment is assigned to process the incoming transaction. In one embodiment, a first resource monitor provides the transaction assignment information to the transaction monitoring manager. Once the target application server instance has been determined, its corresponding resource information is collected and provided to the transaction monitoring manager in step 516. The collected resource information can include the availability of resources for the application server instance as well as its current usage thereof. In one embodiment, a second resource monitor provides the resource information to the transaction monitoring manager. In this embodiment, the second resource monitor collects the resource information from a deployment manager. The deployment manager, in turn, receives the collected resource information from a node agent implemented on each application server instance. In another embodiment, the resource information is provided by a management agent implemented on each computer system in the cluster environment. The management agent, in turn, receives the collected resource information from a node agent implemented on each application server instance.

Then, in step 518, the transaction monitoring manager compares the collected resource information to the transaction's corresponding TMP. A determination is then made in step 520 whether resource usage on the target application server instance exceeds resource threshold values contained in the TPM. If it is determined in step 520 that the resource usage on the target application server instance exceeds resource threshold values contained in the TPM, then monitoring of the transaction begins in step 522. In one embodiment, a probe, or other similar instrumentation in the application running on the application server instance, monitors entry points, or locations in the application where transactions occur. The probe may use identification information about the transaction (e.g., a URL or a specific ID given in the transaction) to map to the corresponding TMP for the transaction. A transaction is uniquely typically identified by supplying a regular expression to match the following parameters: host name, user name, application name, and transaction name. Other key values can also be used to uniquely identify a transaction if needed. Each TMP contains the above mentioned transaction identification information and other information such as scheduling information, resource thresholds, and configuration policies. The schedule defines when the matching transactions will be recorded, a list of predetermined thresholds that are triggered if a transaction's execution time exceeds a predetermined limit, and the configuration policy that determines the level of tracing to be used when monitoring the transaction.

A determination is then made in step 524 whether monitoring of the transaction is completed. If monitoring of the transaction is not completed, then the transaction continues to be monitored in step 522. Otherwise, a determination is made in step 526 whether selective transaction monitoring should be discontinued. If it is determined that selective transaction monitoring should be continued, the process continues, beginning in step 504, with the ongoing acceptance of incoming transactions. Otherwise, selective transaction monitoring operations are ended in step 528.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for selectively monitoring transactions, comprising:
    comparing identification information of a transaction on a first computer system to a transaction monitoring policy to determine whether the transaction is a candidate for monitoring;
    identifying a resource threshold in the transaction monitoring policy if it is determined the transaction should be monitored;
    determining which one of a plurality of servers is assigned to process the transaction, the plurality of servers operating on a plurality of second computer systems in a cluster environment;
    determining whether the resource threshold has been exceeded; and
    monitoring the transaction when the resource threshold has been exceeded.

2. The method of claim 1, wherein
    the first computer system comprises a first transaction manager, a deployment manager, a first resource monitor, and a second resource; and
    the first transaction manager is operable to receive the transaction assignment information from the first resource monitor, the first resource monitor is operable to collect the transaction assignment information from a load balancer and the resource information from the second resource monitor; and
    the second resource monitor is operable to collect the resource information from the deployment manager.

3. The method of claim 2, wherein
    the deployment manager collects the resource information from each of the plurality of servers, each of the plurality of servers comprising a node agent operable to communicate the resource information to the deployment manager.

4. The method of claim 3, wherein
    the first transaction manager uses the transaction assignment information and the resource information to determine whether the transaction should be monitored.

5. The method of claim 1, wherein
    the first computer system comprises a second transaction manager and a third resource monitor;
    each of the plurality of second computer systems comprise a management agent; and,
    the second transaction manager is operable to receive the transaction assignment information from the third resource monitor, the third resource monitor is operable to collect the transaction assignment information from a load balancer and the resource information from the management agent, the management agent is operable to collect the resource information from each of the plurality of servers, each of the plurality of servers comprising a node agent operable to communicate the resource information to the management agent.

6. The method of claim 5, wherein
    the second transaction manager uses the transaction assignment information and the resource information to determine whether the transaction should be monitored.

7. A system comprising:
    a processor;
    a data bus coupled to the processor; and a computer-usable storage medium embodying computer program code, the computer-usable medium being coupled to the data bus, the computer program code selectively monitoring transactions and comprising instructions executable by the processor and configured for:

comparing identification information of a transaction on a first computer system to a transaction monitoring policy to determine whether the transaction is a candidate for monitoring;

identifying a resource threshold in the transaction monitoring policy if it is determined the transaction should be monitored;

determining which one of a plurality of servers is assigned to process the transaction, the plurality of servers operating on a plurality of second computer systems in a cluster environment;

determining whether the resource threshold has been exceeded; and monitoring the transaction when the resource threshold has been exceeded.

8. The system of claim 7, wherein
the first computer system comprises a first transaction manager, a deployment manager, a first resource monitor, and a second resource; and
the first transaction manager is operable to receive the transaction assignment information from the first resource monitor, the first resource monitor is operable to collect the transaction assignment information from a load balancer and the resource information from the second resource monitor; and
the second resource monitor is operable to collect the resource information from the deployment manager.

9. The system of claim 8, wherein
the deployment manager collects the resource information from each of the plurality of servers, each of the plurality of servers comprising a node agent operable to communicate the resource information to the deployment manager.

10. The system of claim 9, wherein
the first transaction manager uses the transaction assignment information and the resource information to determine whether the transaction should be monitored.

11. The system of claim 7, wherein
the first computer system comprises a second transaction manager and a third resource monitor;
each of the plurality of second computer systems comprise a management agent; and,
the second transaction manager is operable to receive the transaction assignment information from the third resource monitor, the third resource monitor is operable to collect the transaction assignment information from a load balancer and the resource information from the management agent, the management agent is operable to collect the resource information from each of the plurality of servers, each of the plurality of servers comprising a node agent operable to communicate the resource information to the management agent.

12. The system of claim 11, wherein
the second transaction manager uses the transaction assignment information and the resource information to determine whether the transaction should be monitored.

13. A computer-usable storage medium embodying computer program code, the computer program code comprising computer executable instructions configured for:

comparing identification information of a transaction on a first computer system to a transaction monitoring policy to determine whether the transaction is a candidate for monitoring;

identifying a resource threshold in the transaction monitoring policy if it is determined the transaction should be monitored;

determining which one of a plurality of servers is assigned to process the transaction, the plurality of servers operating on a plurality of second computer systems in a cluster environment;

determining whether the resource threshold has been exceeded; and monitoring the transaction when the resource threshold has been exceeded.

14. The computer usable medium of claim 13, wherein
the first computer system comprises a first transaction manager, a deployment manager, a first resource monitor, and a second resource; and
the first transaction manager is operable to receive the transaction assignment information from the first resource monitor, the first resource monitor is operable to collect the transaction assignment information from a load balancer and the resource information from the second resource monitor; and
the second resource monitor is operable to collect the resource information from the deployment manager.

15. The computer usable medium of claim 14, wherein
the deployment manager collects the resource information from each of the plurality of servers, each of the plurality of servers comprising a node agent operable to communicate the resource information to the deployment manager.

16. The computer usable medium of claim 15, wherein
the first transaction manager uses the transaction assignment information and the resource information to determine whether the transaction should be monitored.

17. The computer usable medium of claim 13, wherein
the first computer system comprises a second transaction manager and a third resource monitor;
each of the plurality of second computer systems comprise a management agent; and,
the second transaction manager is operable to receive the transaction assignment information from the third resource monitor, the third resource monitor is operable to collect the transaction assignment information from a load balancer and the resource information from the management agent, the management agent is operable to collect the resource information from each of the plurality of servers, each of the plurality of servers comprising a node agent operable to communicate the resource information to the management agent.

18. The computer usable medium of claim 17, wherein
the second transaction manager uses the transaction assignment information and the resource information to determine whether the transaction should be monitored.

19. The computer usable medium of claim 13, wherein
the computer executable instructions are deployable to a client computer from a server at a remote location.

20. The computer usable medium of claim 13,
wherein the computer executable instructions are provided by a service provider to a customer on an on-demand basis.

* * * * *